(12) United States Patent
Weber, Jr. et al.

(10) Patent No.: US 8,860,353 B1
(45) Date of Patent: Oct. 14, 2014

(54) PROTECTION FOR A NETWORK PROTECTOR CLOSE MOTOR

(75) Inventors: John Robert Weber, Jr., Fort Salonga, NY (US); Charles Thomas Barnes, Forest Hills, NY (US)

(73) Assignee: DGI Creations, LLC, Raleigh, NC (US)

( * ) Notice: Subject to any disclaimer, the term of this patent is extended or adjusted under 35 U.S.C. 154(b) by 787 days.

(21) Appl. No.: 13/092,795

(22) Filed: Apr. 22, 2011

(51) Int. Cl.
*G05B 11/01* (2006.01)

(52) U.S. Cl.
USPC .......................................................... 318/671

(58) Field of Classification Search
CPC ..................................................... H02H 7/0833
USPC .......................................................... 318/671
See application file for complete search history.

(56) References Cited

U.S. PATENT DOCUMENTS

| | | | |
|---|---|---|---|
| 1,955,311 A * | 4/1934 | Parsons | 361/66 |
| 2,196,138 A | 4/1940 | Bullard | 175/294 |
| 3,405,320 A | 10/1968 | Schwanenflugel | 317/27 |
| 3,697,811 A * | 10/1972 | Little | 361/82 |
| 3,831,061 A | 8/1974 | Boyd | 317/36 |
| 3,962,547 A | 6/1976 | Pattantyus-Abraham | 179/2.5 |
| 4,065,763 A | 12/1977 | Whyte et al. | 340/310 |
| 4,293,886 A | 10/1981 | Church et al. | 361/71 |
| 4,523,307 A | 6/1985 | Brown et al. | 370/30 |
| 4,538,196 A | 8/1985 | Sun et al. | 361/64 |
| 4,642,607 A | 2/1987 | Strom et al. | 340/310 |
| 4,757,416 A | 7/1988 | Wilkerson | 361/84 |
| 4,845,594 A | 7/1989 | Wilkerson | 361/71 |
| 4,862,157 A | 8/1989 | Noel | 340/825 |
| 5,185,705 A * | 2/1993 | Farrington | 700/292 |
| 5,475,558 A | 12/1995 | Barjonnet et al. | 361/64 |
| 5,822,165 A | 10/1998 | Moran | 361/78 |
| 5,859,596 A | 1/1999 | McRae | 340/870.02 |
| 5,892,645 A * | 4/1999 | Watanabe et al. | 361/85 |
| 6,407,897 B1 * | 6/2002 | Yanniello et al. | 361/62 |
| 6,407,987 B1 | 6/2002 | Abraham | 370/295 |
| 6,496,342 B1 | 12/2002 | Horvath et al. | 361/65 |
| 6,654,216 B2 | 11/2003 | Horvath et al. | 361/65 |
| 6,671,151 B2 | 12/2003 | Smith et al. | 361/93.2 |
| 6,980,089 B1 | 12/2005 | Kline | 340/310.01 |
| 7,203,040 B2 | 4/2007 | Shipp | |
| 7,242,729 B1 | 7/2007 | Heistermann et al. | 375/329 |
| 7,301,738 B2 | 11/2007 | Pearlman et al. | 361/42 |
| 7,366,773 B2 | 4/2008 | Weber, Jr. | 709/223 |
| 7,403,015 B2 | 7/2008 | Carlino et al. | 324/424 |
| 7,519,134 B1 | 4/2009 | Heistermann et al. | 375/329 |
| 7,606,298 B1 | 10/2009 | Weber, Jr. et al. | 375/224 |

(Continued)

OTHER PUBLICATIONS

IEEE Std C57.12.44-2005, "IEEE Standard Requirements for Secondary Network Protectors", IEEE, 63 pgs. (Jun. 7, 2006).

(Continued)

*Primary Examiner* — Erick Glass
(74) *Attorney, Agent, or Firm* — Kevin E. Flynn; Flynn IP Law

(57) ABSTRACT

Methods of intervening to protect a close motor for a network protector unit for a power distribution transformer are discussed. The close motor is protected from damage by intervening to prevent further attempts to energize the close motor after an abnormal condition is detected. The intervention may be cleared after a cooling off period or some other metric. In some implementations, the intervention remains in effect until an operator investigates and then clears the intervention so that the close motor may be energized to close the network protector breaker.

23 Claims, 10 Drawing Sheets

(56) References Cited

U.S. PATENT DOCUMENTS

| | | | |
|---|---|---|---|
| 7,808,128 B1 | 10/2010 | Weber, Jr. et al. | 307/127 |
| 2003/0216876 A1* | 11/2003 | Premerlani et al. | 702/58 |
| 2006/0087783 A1 | 4/2006 | Holley | 361/81 |
| 2006/0165023 A1 | 7/2006 | Faulkner et al. | 370/310 |
| 2007/0249319 A1 | 10/2007 | Faulkner et al. | 455/402 |

OTHER PUBLICATIONS

Office Action dated Apr. 15, 2008 for related U.S. Appl. No. 11/272,632, 15 pgs.

Office Action dated Oct. 16, 2008 for related U.S. Appl. No. 11/272,632, 10 pgs.

* cited by examiner

FIG. 9

- Pump Protect Mode:

[Restore Defaults]                    Enable

Cycle Limit: [3]    Cycles  ☑
  Pump Time:  [35]   Seconds

Motor Timeout: [10]  Seconds  ☑

Motor Cycles: [5]    Cycles  ☑

Protect Time: [20 1360]  Minutes

☐ Never Reclose     [Clear Pump Protect]
   ⎵
   1368          ╱1384       [Send]

Pump Type:  No Pumping Problems

PROTECTION FOR A NETWORK PROTECTOR CLOSE MOTOR

BACKGROUND

1. Field of the Disclosure

This disclosure relates generally to control systems for power distribution equipment. More specifically, this disclosure relates to control system actions to prevent a motor known as a "close motor" in a network protector unit from burning out. Network protectors and the close motor for network protectors can be used in both spot networks and grid networks.

In order to provide context it is useful to start with a simplified network diagram.

A simplified drawing is provided in FIG. 1 to introduce certain relevant components. As the focus of this application is on the protection of the network protector close motor, many relevant components that would be present in an actual power grid distribution system have been omitted.

A portion of an electrical distribution network is shown as network 100. Network 100 has feeder bus 104, feeder bus 108, and feeder bus 112. A representative voltage for operation of these feeder buses may be 13 Kv but other systems may operate at 27 Kv, 34 Kv or some other voltage. The power on these three buses is provided to a set of local distribution networks 116 to serve loads represented by 120, 124, and 128. The voltage on these local distribution networks is apt to be 120 volts, but it could be 277 volts, 341 volts or some other voltage. In some cases these loads represent a building or even a portion of a very large building. Depending on the amount of load, the local distribution network may be coupled to one, two, or three feeder buses (104, 108, and 112). Even when the load can consistently be serviced by just one feeder bus, a desire for reliability leads to providing a redundant path for providing service in case of equipment failure, scheduled maintenance, load balancing, or other needs. Actual networks may have more than three possible feeder buses connected to a particular local distribution network but simplified FIG. 1 is sufficient for introducing the concepts relevant to the present invention.

The local distribution networks 116 are coupled to the feeder buses 104, 108, and 112 through transformers 150 and related equipment. The transformers 150 convert the relatively higher voltage on the primary side 154 of the transformers 150 to the relatively low voltage on the secondary side 158 of the transformers 150.

The transformers 150 are connected to the feeder buses (104, 108, and 112). The feeder buses may be isolated from the network by breakers 162. Primary fuse links 174 may exist adjacent to the breakers 162. The transformers 150 have network protectors 166 on the secondary side 158 of the transformers 150 to isolate the transformers 150 from the local distribution networks 116 as needed to protect the transformers from current flowing from the distribution networks 116 to the primary side 154 of the transformers (known as back feed). The network protectors 166 are frequently contained in a submersible enclosure bolted to the throat of the transformer 150 which is placed in underground vaults. Network protectors 166 are an important component in a distribution network. The network protectors are subject to IEEE standard C57.12.44.

Additionally, some networks include sets of fuse links 170 between the network protectors 166 and the local distribution networks 116.

The feeder buses 104, 108, and 112 can be isolated by a set of substation breakers 178 from the substation buses 182 that are the next portion of the transmission network which is ultimately connected to a set of power sources that drive generators. The power sources are symbolically represented here by turbine 190.

FIG. 1 shows a small portion of the network which may have more feeder buses and many more local distribution networks 116 providing power to many more loads. These loads may be distributed around a portion of a city. The various transformers 150 may be in pits (vaults) near the various loads. Thus it is convenient to inject analog signals onto the power lines so that the analog signals can be picked off by pick-up coils from the feeder buses at the substation and fed to a receiver 186. These analog signals are often in the frequency range of 40 kHz to 70 kHz which is much higher than the frequency of the power being distributed over the network. (For example one common frequency for power grids is 60 Hertz although other frequencies are used throughout the world and can be used in connection with the present invention).

A preferred location for injecting the analog signal containing information about the operation of a transformer and related equipment is on the secondary side 158 of the transformer between the network protector 166 and the load. Transmitter 130 is shown in FIG. 1 to illustrate this location. Placement of transmitter 130 in this location allows for the injection of the analog signal onto the relatively low voltage, secondary side of the transformer 150. Traversing the transformer 150 from secondary side to primary side provides only a slight attenuation of the high frequency carrier signal.

2. FIG. 2

FIG. 2 provides additional detail on the network protector 166. Network protector 166 has a network protector relay that is shown here in logical components to facilitate discussion. Network protector relay logic 204 operates to open or close network protector breaker 208. Network protector relay logic 204 has access to voltage indications by voltage measuring equipment (not shown) connected to secondary side connections 212 for each of the three phases and to load side connections 216. Alternatively, the network protector relay logic may have access to one set of voltages and one set of differential voltages. Other sets of data to accomplish the same end would be apparent to one of skill in the art.

The network protector relay logic 204 may also have access to output from a set of three current transformers (not shown) or a single output from an aggregating current transformer. In either case, the network protector relay logic 204 can detect the flow of current towards the transformer 150 from the local distribution network and intervene to open the network protector breaker 208. The network protector relay logic 204 may also have access to information about the phase angles of the power for each phase on either side of the network protector breaker 208. The network protector relay logic 204 may automatically close the network protector breaker 208 when appropriate to connect the secondary side of the transformer 150 to the local distribution network 116.

The network protector relay logic 204 may respond to local operation of rules or to an external request to open or close the network protector breaker 208.

The network protector breaker 208 is opened through the energy stored in springs (not shown) that are loaded with energy as the network protector breaker 208 is driven closed by close motor 220. The system to allow the springs to trip the network protector breaker 208 to open may be in communication with a trip relay (not shown). The trip relay may be normally energized and a de-energized status of the trip relay causes a trip. Thus, a loss of power by the network protector relay logic 204 will cause the trip relay to become de-energized and fail-safe by opening the network protector breaker 208.

Close motor 220 is energized by the network protector relay logic 204 in order to close the network protector breaker 208. A close contact 240 under control of the network protector relay logic 204 selectively applies power from a power supply to the close motor 220.

The close motor 220 may not operate the network protector breaker 208 directly but may be connected to a spring (not shown here) that is loaded and used to rapidly close the network protector breaker 208. Typically, one close motor 220 is used to close all three phases. The close motor may be a small single phase commutator high torque motor.

Repeated use of the close motor 220 in quick succession as the network protector breaker 208 continues to reopen can cause the close motor 220 to burn out and become inoperable. The prior art network protector relay logic 204 monitored for pumping where "pumping" is the repeated successful closing and opening of the network protector breaker 208.

SUMMARY OF DISCLOSURE

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provided below as one of skill in the art will recognize that inventive concepts illustrated in various examples can be combined together in order to address a specific application.

Other systems, methods, features and advantages of the disclosed teachings will be or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 9 is a screen shot of a pump protect mode screen where a user can tailor the settings for close motor protection and the never reclose option has not been selected.

DETAILED DESCRIPTION

Figure 2:
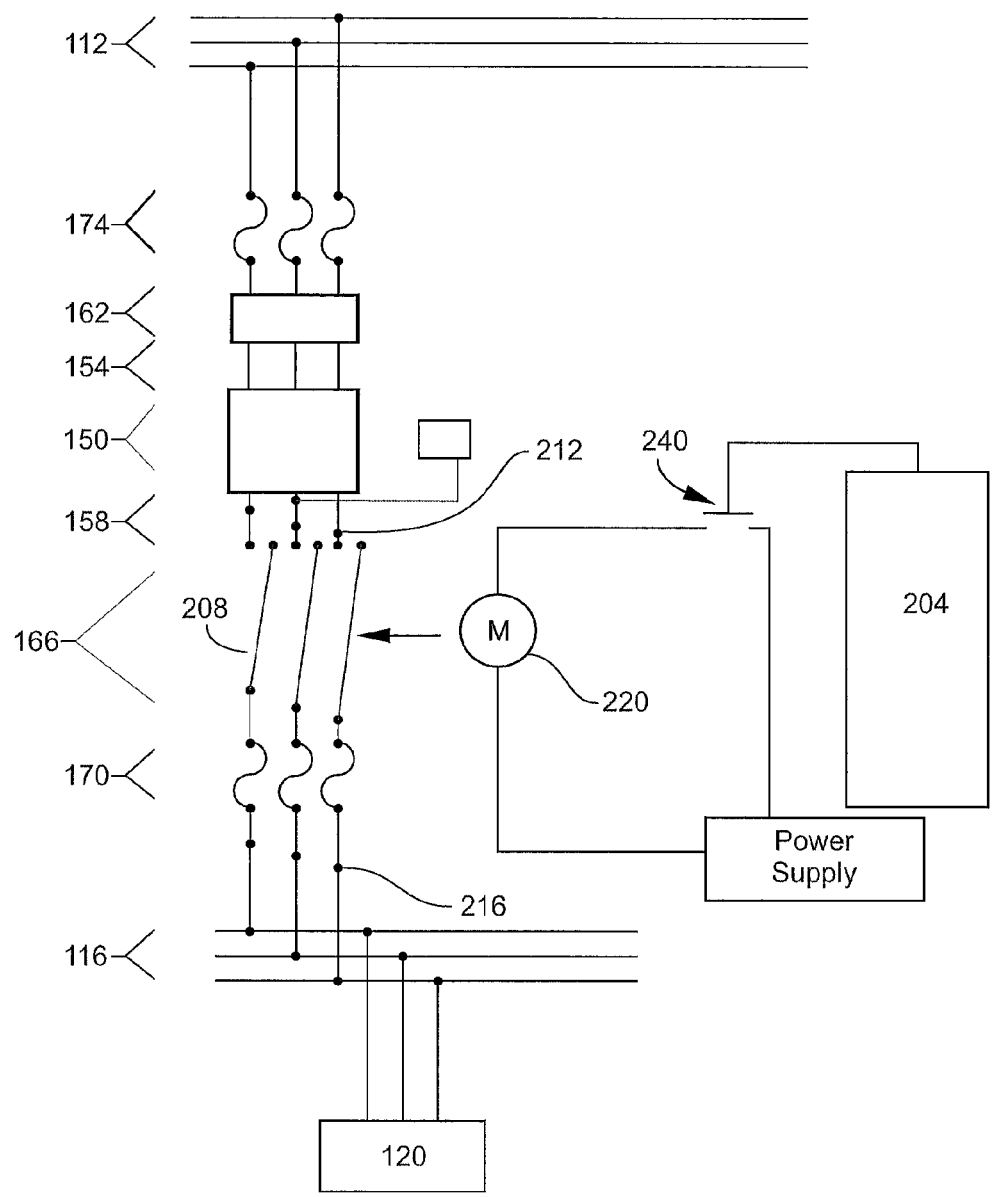
FIG. 2 shows a portion of FIG. 1 but provides more details on the operation of the network protector logic and the close motor of the network protector.
Figure 3:
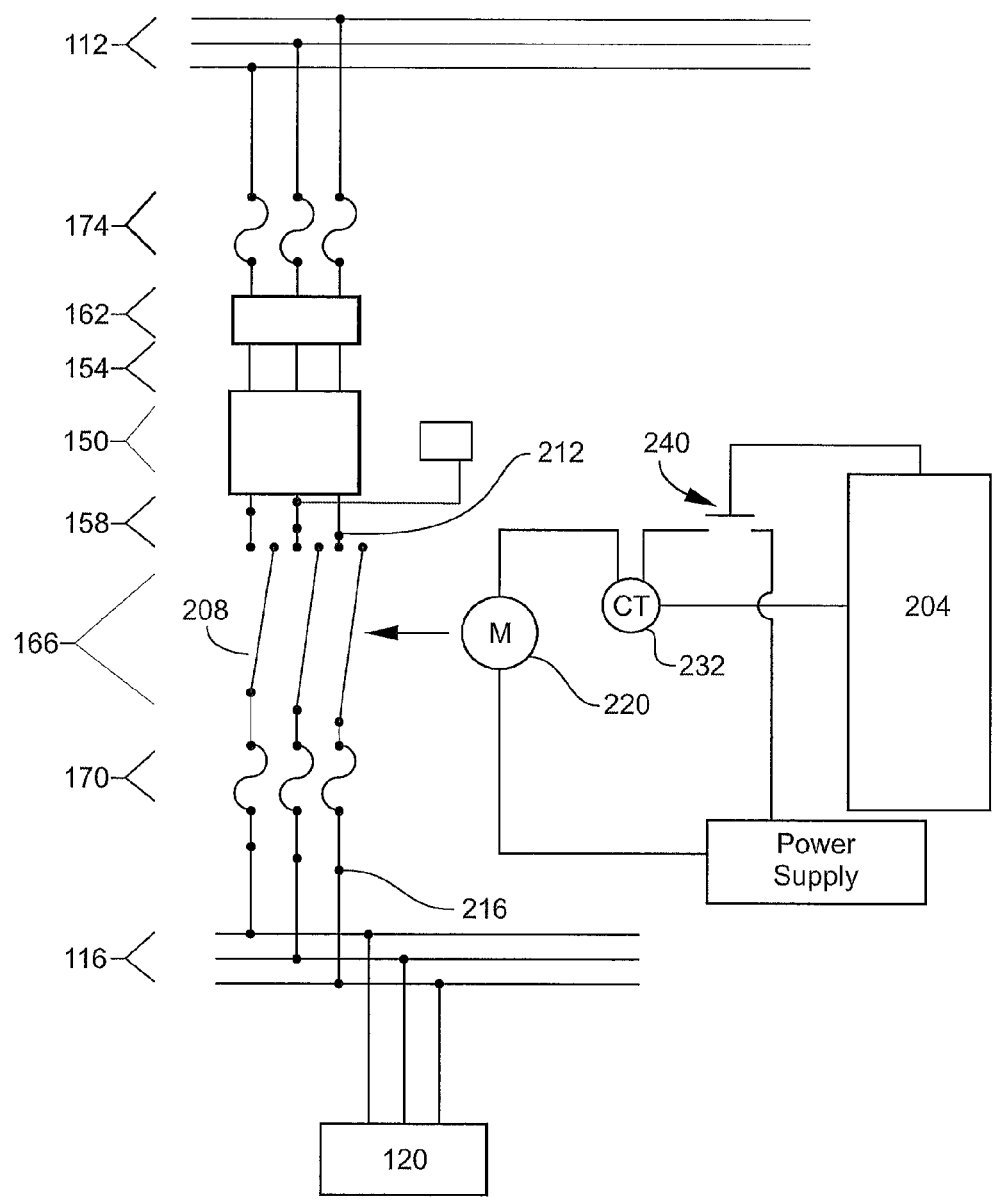
FIG. 3 shows components shown in FIG. 2 but with the addition of a current transformer to provide information that may be used to protect the close motor.

FIG. 3 is similar to FIG. 2 but show that the current provided to the close motor 220 may be monitored by a current transformer 232 and fed to the network protector relay logic 204.

An extended effort by the close motor 220 to close a network protector breaker 208 when the network protector breaker 208 is refusing to close may result in damage to the close motor 220. (Likewise a prolonged attempt to wind the spring used to close the network protector breaker 208 may damage the close motor 220.) Thus, in addition to the original need to repair the problem with the network protector breaker 208 and related equipment, prolonged operation of the close motor 220 may make it necessary to also replace the close motor 220.

As described below, monitoring the current provided to the close motor 220 provides a way to intervene before the close motor 220 is damaged.

Other Failure Modes.

The close motor 220 may not operate as a wire providing current to the close motor has burned out. In one implementation, the voltage would be applied, but without a wire to carry current, nothing will happen. Eventually, a failure to close error will be communicated.

The close motor may not operate as a safety interlock may have been left in the lock-out position. Many network protectors have a handle that is used to deactivate the network protector as a safety measure before maintenance. This handle may have been inadvertently left in lock-out position. With this handle in lock-out position the close motor 220 cannot be activated by the network protector relay logic 204. For example, the handle in the lock-out position may preclude the close contact 240 from closing even if requested by the network protector relay logic 204. If the lock-out position prevents the close motor from receiving current, then eventually a failure to close error will be sent.

A constant current failure may occur if the close motor 220 operates but an operational failure prevents completion of the assigned tasks including the wind up of the spring used to open or close the network protector breaker 208. The failure could be a broken spring, worm gear, clutch, or other component. In some network protectors, the close motor draws current constantly when operating, and if not being successful, continues to draw current. In other network protectors, the close motor receives a brief burst of current and then if that was not sufficient, another burst of current.

Figure 4:
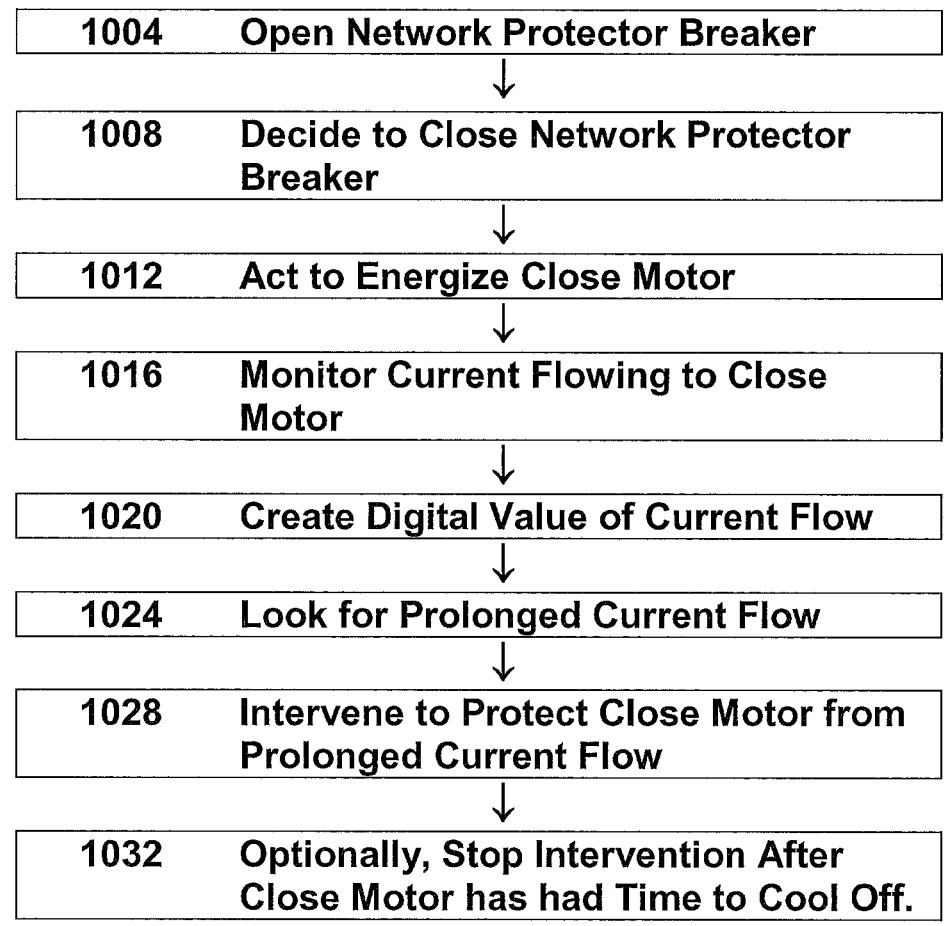
FIG. 4 is a flowchart for a process to protect a close motor from a sustained failure to close.

FIG. 4—Protection from a Sustained Failure to Close.

FIG. 4 sets forth a process 1000 with one set of interventions that may be taken to protect the close motor 220. Various pieces of hardware referenced in the description of FIG. 4 are found in FIG. 3.

1004—The network protector relay logic 204 initiates a process to open the network protector breaker 208 to isolate a transformer 150 from the potential of back feed from the local distribution network 116. For purposes of this example, it does not matter whether the network protector relay logic 204 is operating based on local execution of rules in reaction to the voltage measurements across the network protector breaker 208 or if the network protector relay logic 204 is reacting to a command sent from a remote location.

1008—Based upon network conditions it may become desirable to close the network protector breaker 208 to allow power to flow from the protected transformer to the local distribution network 116. The network protector relay logic 204 may operate based on its own instruments and logic. Alternatively, some network protectors may respond to remote requests to close.

1012—The network protector relay logic 204 closes a close contact 240 to energize the close motor 220.

1016—A current transformer 232 monitors the current provided to the close motor 220 and provides an indication of the current to the network protector relay logic 204.

1020—An analog to digital converter converts the analog output from the current transformer 232 to provide a binary number representative of the current provided to the close motor 220.

1024—The network protector relay logic 204 monitors the digital output from the analog to digital converter and detects a failure of the close motor 220 to close. One way to implement this step is to have the network protector relay detect a current flow in excess of value A for a time period of T. By way of example, if a close motor 220 is at risk of burning out if it is energized for 25 to 30 seconds, then the network protector relay logic 204 may intervene when elevated levels of current are detected for a period in excess of the longest normal period to close a network protector breaker 208 including the time to energize the spring used to open the network protector breaker. The time chosen should be safely below the 25 second duration that risks possibly burning out the close motor 220. For example, detection of a period of 10 seconds of elevated current flow to the close motor 220 may be taken as need to intervene.

1028—After detecting a failure to close, the network protector relay logic 204 may take action to protect the close motor 220 from burning out.

1032—The action to prevent further attempts to energize the close motor 220 may be set to allow a retry after a set period of time. This period of time should be long enough to allow the close motor 220 to cool down from the extended attempt to close. One of skill in the art will recognize that instead of using a timer, that the temperature of the close motor may be monitored and used as the criteria for ending the intervention to protect the close motor.

Alternatively, the logic may be set to never reclose based merely on the passage of time but to require a user input to clear the close motor protection.

Figure 5:
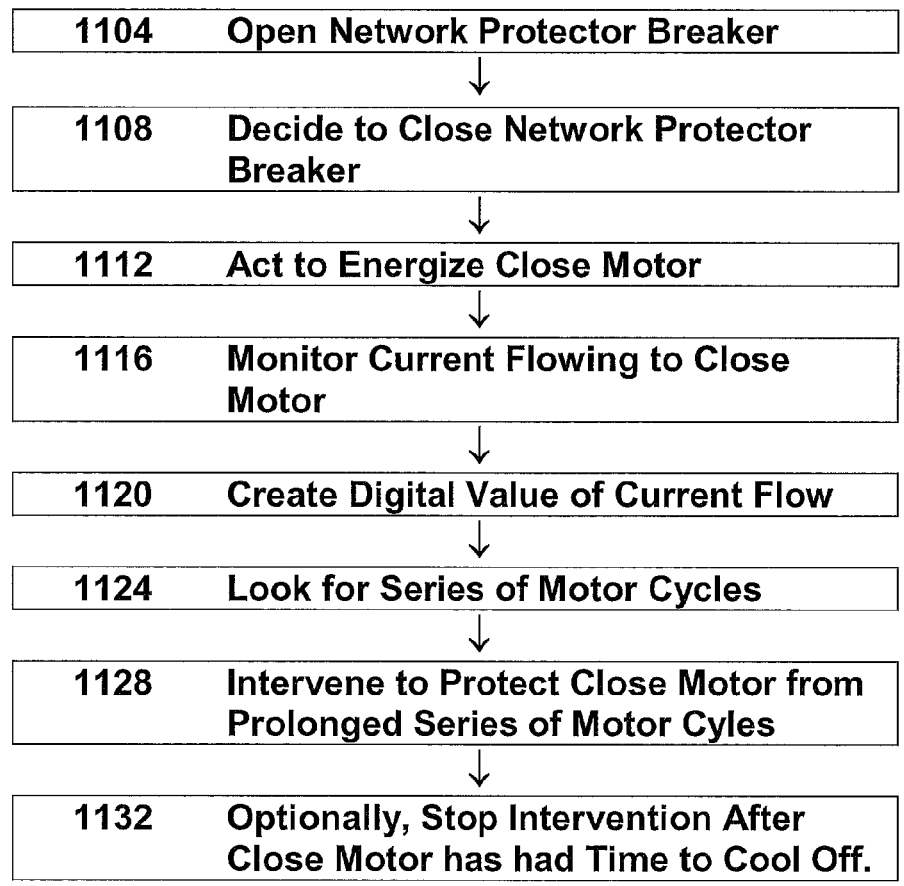
FIG. 5 is a flowchart for a process to protect a close motor from a motor cycle failure.

FIG. 5—Protection from Motor Cycle Failure.

While some close motors exhibit a failure by a prolonged continuous application of current to the close motor not being effective, other close motors exhibit a different failure mode. Some close motors receive bursts of power. If one burst of power does not do the job, then additional bursts of power are provided. As with the extended application of current to some close motors causes failure of the motor, the rapid application of a number of bursts of power to a close motor causes the motor to overheat and causes damage to the close motor. For the latter type, it is useful to monitor for repeated cycles of current bursts (on then off) rather than looking in vain for a single period of current flow in excess of x seconds. This type of failure signature can be called a Bouncing Current Failure or a Motor Cycle Failure.

FIG. 5 sets forth a process 1100 with one set of interventions that may be taken to protect the close motor 220. Various pieces of hardware referenced in the description of FIG. 5 are found in FIG. 3.

1104—The network protector relay logic 204 initiates a process to open the network protector breaker 208 to isolate a transformer 150 from the potential of back feed from the local distribution network 116. For purposes of this example, it does not matter whether the network protector relay logic 204 is operating based on local execution of rules in reaction to the voltage measurements across the network protector breaker 208 or if the network protector relay logic 204 is reacting to a command sent from a remote location.

1108—Based upon network conditions it may become desirable to close the network protector breaker 208 to allow power to flow from the protected transformer to the local distribution network 116. The network protector relay logic 204 may operate based on its own instruments and logic. Alternatively, some network protectors may respond to remote requests to close.

1112—The network protector relay logic 204 closes a close contact 240 to energize the close motor 220.

1116—A current transformer 232 monitors the current provided to the close motor 220 and provides an indication of the current to the network protector relay logic 204.

1120—An analog to digital converter converts the analog output from the current transformer 232 to provide a binary number representative of the current provided to the close motor 220.

1124—The network protector relay logic 204 monitors the digital output from the analog to digital converter and detects a failure of the close motor 220 to close. One way to implement this step is to have the network protector relay logic 204 detect series of motor cycles, which is a series of bursts of current applied to the motor in response to a single request to close. After a successful close, the count of motor cycles is reset.

By way of example, if a close motor 220 is at risk of burning out if it is energized nine motor cycles in quick succession; then the network protector relay logic 204 may intervene after five motor cycles.

1128—After detecting a failure to close, the network protector relay logic 204 may take action to protect the close motor 220 from burning out.

1132—The action to prevent further attempts to energize the close motor 220 may be set to allow a retry after a set period of time. This period of time should be long enough to allow the close motor 220 to cool down from the proscribed series of motor cycles within a short period. One of skill in the art will recognize that instead of using a timer, that the temperature of the close motor may be monitored and used as the criteria for ending the intervention to protect the close motor.

Alternatively, the logic may be set to never reclose based merely on the passage of time but to require a user input to clear the close motor protection.

One skilled in the art could implement an alternative that simply looks at the number of motor cycles within a set period of time and intervenes to protect the close motor if the number of motor cycles exceeds a set limit. This alternative would not reset the motor cycle count with a successful close of the network protector breaker.

Figure 6:
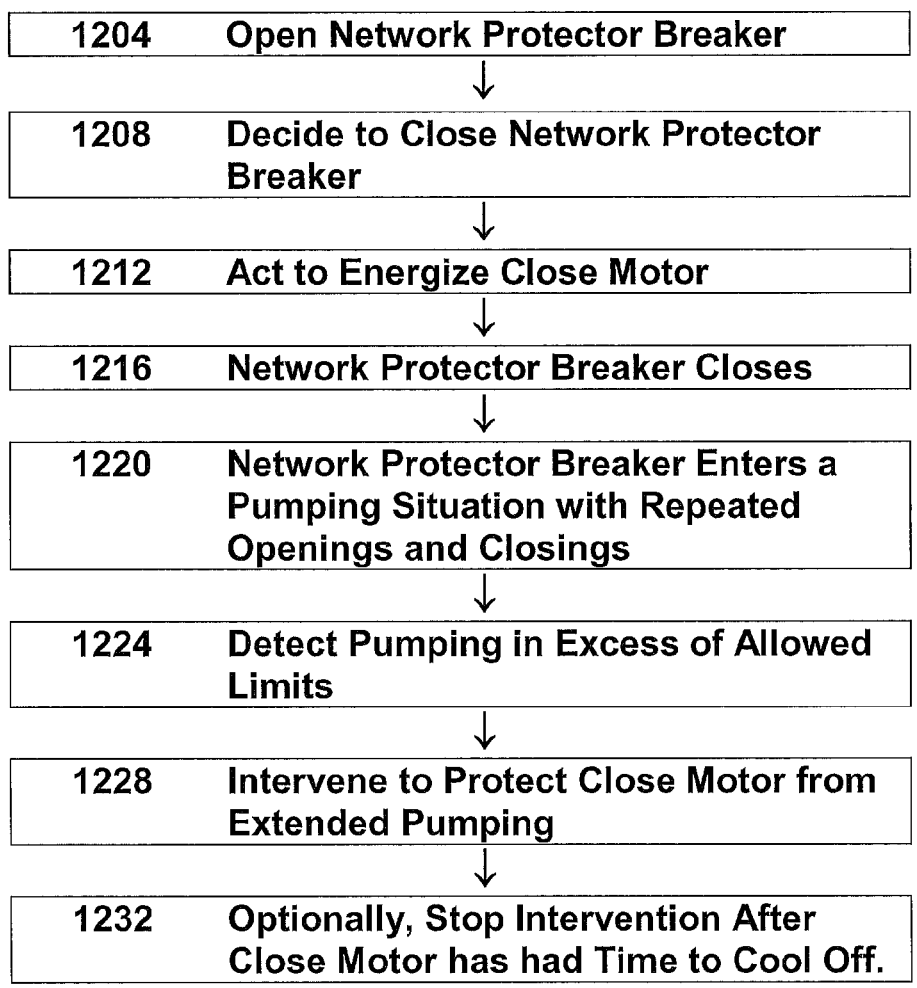
FIG. 6 is a flowchart for a process to protect a close motor from a situation with a repeated failure of the network protector to stay closed.

FIG. 6—Protection from Repeated Failure to Stay Closed.

FIG. 6 sets forth a process 1200 with one set of interventions that may be taken to protect the close motor 220. Various pieces of hardware referenced in the description of FIG. 6 are found in FIG. 3. FIG. 6 begins with steps found at the beginning of FIG. 4.

1204—The network protector relay logic 204 initiates a process to open the network protector breaker 208 to isolate a transformer 150 from the potential of back feed from the local distribution network 116. For purposes of this example, it does not matter whether the network protector relay logic 204 is operating based on local execution of rules in reaction to the voltage measurements across the network protector breaker 208 or if the network protector relay logic 204 is reacting to a command sent from a remote location.

1208—The network protector relay logic 204 initiates a process to close the network protector breaker 208 to isolate a transformer 150 from the potential of back feed from the local distribution network 116. For purposes of this example, it does not matter whether the network protector relay logic 204 is operating based on local execution of rules in reaction to the voltage measurements across the network protector breaker 208 or if the network protector relay logic 204 is reacting to a command sent from a remote location.

1212—The network protector relay logic 204 closes the close contact 240 to energize the close motor 220.

1216—The network protector breaker 208 closes.

1220—The network protector breaker enters a pumping situation with repeated openings and closings. Each time, the network protector relay logic 204 reacts to the measured values across the closed network protector breaker 208 and opts to open the network protector breaker 208 using the energy stored in a spring used for this purpose. While this would be fine after a significant period after closing the network protector breaker 208, it is not fine if this network protector breaker 208 is opened substantially immediately after closing as the network protector relay logic 204 may attempt to close the network protector breaker 208 as soon as it opens. The term "substantially immediately" includes within a millisecond of closing.

Repeatedly opening and closing the network protector breaker 208 indicates a malfunction such as a conflict within the logic or between inputs used to close the network protector breaker 208 and the logic to cause opening of the network protector breaker 208. Repeatedly using the close motor 220 to close the network protector breaker 208 and energize the spring used to open the network protector breaker 208 without allowing the close motor 220 to cool off risks burning out the close motor 220. While the close motor 220 may be sized adequately to allow for a few repeated closings as this might happen in a network experiencing some transient conditions, a large number of repeated closing (for example 3) is apt to burn out the close motor and render that transformer out of service as it cannot be reconnected to the local distribution network 116. Repeated closings with near immediate openings are sometimes called "pumping".

1224—Detect pumping with a number of repeated open close cycles equal to R within a time period P.

1228—After the network protector relay logic 204 detects pumping with number of repeated open close cycles equal to R within a time period P, the network protector relay logic 204 takes measures to protect the close motor 220. By way of example, the system could be set to say that three close open cycles in 35 seconds is too many and indicative of a problem requiring intervention.

The measures to protect the close motor 220 may be to immediately stop any further attempts to close the network protector breaker 208 through use of close motor 220. This may be combined with a communication to a remote location of the detection of pumping and the protective action taken. The protective action may be stopped after the equipment has been repaired.

Another way to protect the close motor 220 is to enact a timed dead band period after detecting pumping so that the close motor 220 is given a chance to cool off before allowing the close motor to be energized to attempt to close the network protector breaker 208. One of skill in the art will recognize that instead of using a timer, that the temperature of the close motor may be monitored and used as the criteria for ending the intervention to protect the close motor.

If the pumping was the result of transient conditions on the network and inappropriately tight settings for the voltage differential across the network protector to trigger opening, then it is possible that the operation during a more stable period would not trigger pumping.

If the pumping is the result of instrument failure such that the voltage differential across the network protector breaker 208 is not being accurately measured, then a remote request to close the network protector breaker 208 may be appropriate, but the closing may trigger an inappropriate response by the network protector relay logic 204 based upon erroneous voltage measurements to immediately reopen the closed network protector breaker 208.

Optionally, a second or an $x^{th}$ instance of pumping after cooling off periods may trigger a removal of service and communication of a need for repair as described above.

Figure 7:
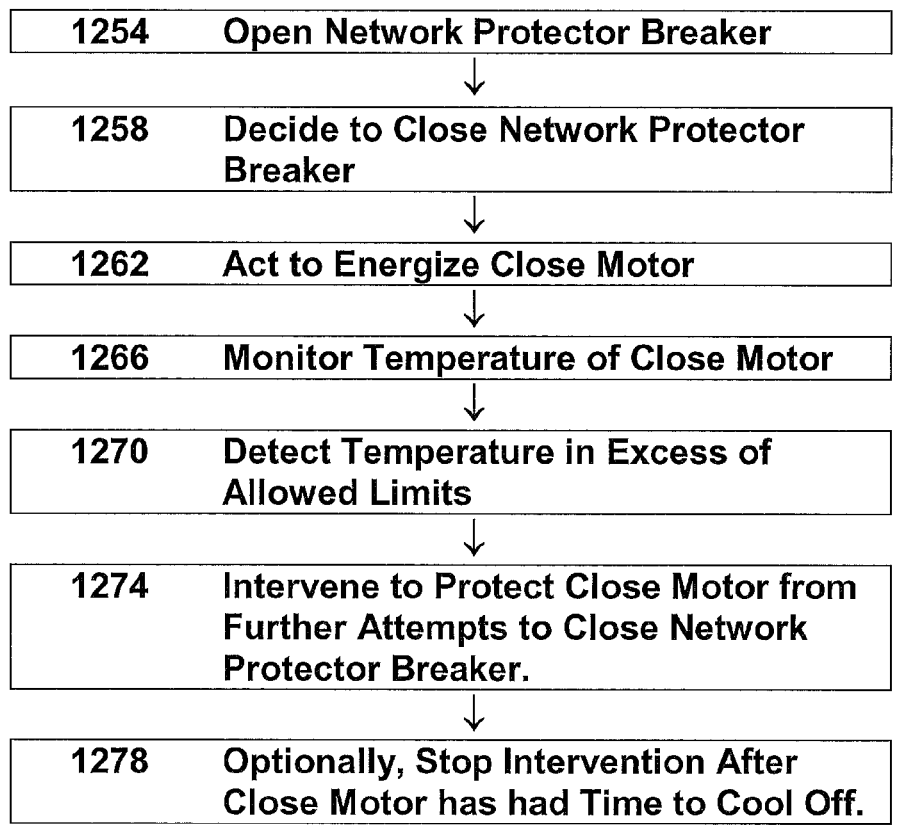
FIG. 7 is a flowchart for a process to protect a close motor from a thermal excursion.

FIG. 7—Protection from a Thermal Excursion.

FIG. 7 sets forth a process 1250 with one set of interventions that may be taken to protect the close motor 220. Various pieces of hardware referenced in the description of FIG. 7 are found in FIG. 3.

1254—The network protector relay logic 204 initiates a process to open the network protector breaker 208 to isolate a transformer 150 from the potential of back feed from the local distribution network 116. For purposes of this example, it does not matter whether the network protector relay logic 204 is operating based on local execution of rules in reaction to the voltage measurements across the network protector breaker 208 or if the network protector relay logic 204 is reacting to a command sent from a remote location.

1258—Based upon network conditions it may become desirable to close the network protector breaker 208 to allow power to flow from the protected transformer to the local distribution network 116. The network protector relay logic 204 may operate based on its own instruments and logic. Alternatively, some network protectors may respond to remote requests to close.

1262—The network protector relay logic 204 closes a close contact 240 to energize the close motor 220.

1266—At least one temperature associated with the close motor is monitored. In some implementations a temperature of the air near the close motor may be monitored (such as the ambient temperature within the network protector housing) in order to look for relative temperature changes. An alternative to using the ambient air temperature is to use the temperature of the motor before the start of the close cycle.

1270—Determine that the temperature rise in the close motor indicates an abnormal situation, such that intervention to protect the close motor is warranted. This may be implemented by looking at the absolute temperature of the close motor. Alternatively, the indication of a problem could be a relative rise in temperature over the recent average temperature of an inactive close motor or the temperature relative to an ambient temperature in the network protector housing.

As an alternative to temperature, the need for intervention could be based on the rate of change of temperature for a minimum period of time.

One of skill in the art will recognize that engineering judgment will be needed in order to balance the risk of being overprotective and intervening when not necessary or being slow to intervene and possibly allowing the measured temperature to rise so significantly before intervening that there is some risk of damage to the close motor.

1274—After detecting a temperature rise indicative of an abnormal situation, the network protector relay logic 204 may take action to protect the close motor 220 from burning out.

1032—The action to prevent further attempts to energize the close motor 220 may be set to allow a retry after a set period of time. This period of time should be long enough to allow the close motor 220 to cool down from the extended attempt to close. One of skill in the art will recognize that instead of using a timer, that the temperature of the close motor may be monitored and used as the criteria for ending the intervention to protect the close motor.

Alternatively, the logic may be set to never reclose based merely on the passage of time or a measured temperature but to require a user input to clear the close motor protection.

Actions to Protect the Close Motor.

Figure 1:
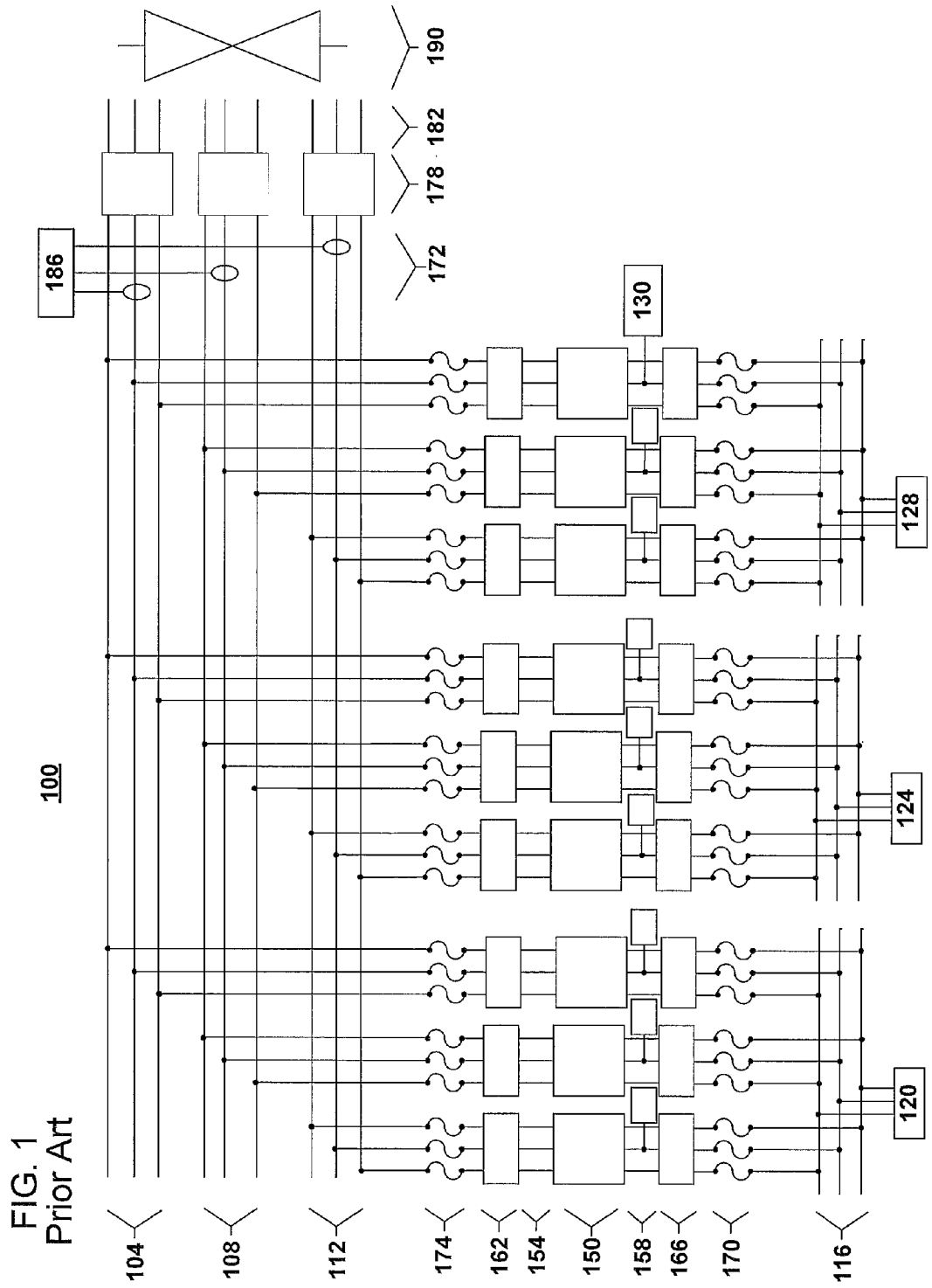
FIG. 1 is a schematic diagram showing relevant components in a power grid distribution system.

Processes 1000, 1100, 1200 and 1250 call for interventions to protect the close motor from harm. The close motor may be protected in several different ways. One way of protecting a close motor 220 from the risk of burning out is to react to the first failure to close by simply refusing any additional efforts to close the close motor based on local logic or remote instructions. The failure of the close motor may be communicated to a remote location so that the status is known and crews may be dispatched to troubleshoot and repair the relevant equipment. The communication may done in a variety of ways including through the transmission of information via power line carrier transmitter 130 to receiver 186 (FIG. 1) via pick up coils 172 (FIG. 1).

Another way to protect the close motor 220 is to enact a timed dead band period after detecting a need to intervene so that the close motor 220 is given a chance to cool off before allowing the close motor to be energized to attempt to close the network protector breaker 208.

Optionally, a failure to close a second or an $x^{th}$ time after cooling off periods may trigger a removal of service and communication of a need for repair as described above. One of skill in the art will recognize that instead of using a timer, that the temperature of the close motor may be monitored and used as the criteria for ending the intervention to protect the close motor.

The system may be set up to use one type of protection (remove from service until maintenance is performed) for a motor timeout for a 10 second attempt to close and use another form of protection (close motor dead band protection) for another type of problem such as too many close/open cycles within an allotted time period.

Figure 8:
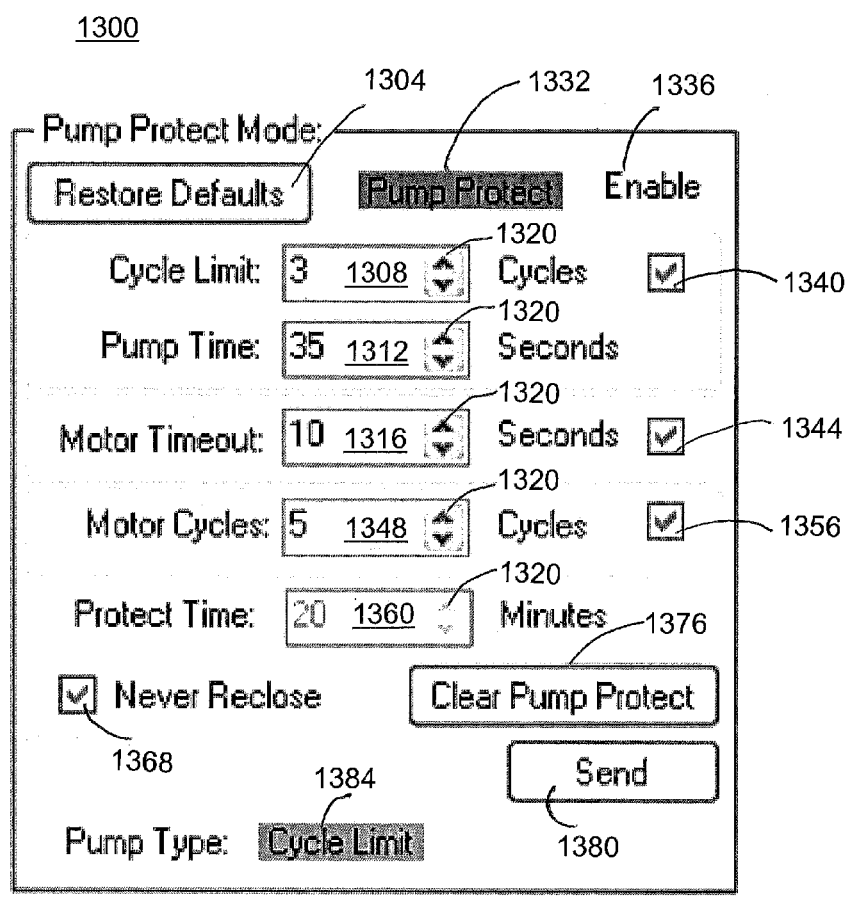
FIG. 8 is a screen shot of a pump protect mode screen where a user can tailor the settings for close motor protection and the never reclose option has been selected.

FIG. 8—User Interface & Never Close Option.

FIG. 8 is a screen shot of a pump protect mode screen 1300 where a user can tailor the settings for close motor protection. This screen could be part of a laptop or other mobile device that is brought to the vault to set the equipment to particular preferences for that utility or for specific nuances of the motor (such as the length of operating time that might cause damage or the length of time to cool off). This screen may be part of a control system at a remote location that can update the settings of the close motor protection scheme from afar as there is communication to the local equipment.

The various components of the pump protect mode screen 1300 are set forth below. One of skill in the art will recognize that information can be collected, edited, and displayed in a countless number of ways so this precise combination of user interface elements is not central to the use of the teachings of the present disclosure.

1304 is an input button to restore all settings to the default settings.

1308 is the current value for cycle limits that has been entered with input arrows 1320. This value may not represent the current value at the local equipment until a successful send operation. Alternatively, the value 1308 or other values listed below as input via input arrows 1320 may be entered directly through a keyboard or other conventional input tool.

1312 is the current value for pump time in seconds as entered via input arrows 1320.

1340 is an enable box where the anti-pump selection can be selected for use (rather than not having an anti-pump selection). With 1340 enabled, the current set of settings seeks to intervene when there are three close attempts within 35 seconds. In the example shown in FIG. 8, the current settings would react to a third attempt to close and act to protect the close motor.

1316 is the current setting in seconds for motor time out. This setting can be adjusted by input arrows 1320. 1344 is the enable box. With 1344 enabled, the system will intervene to protect the close motor after any continuous attempt of 10 seconds to close the close motor (most likely as indicated by current above a certain threshold being applied to the close motor for 10 seconds).

1348 is the current setting for motor cycles. This setting may be adjusted by input arrows 1320. Enable box 1356 is used to enable or disable this protection. As noted above, some close motors are provided with bursts of current rather than a continuous current. This form of close motor protection intervenes if a certain number of current bursts are provided within a particular period of time. This sort of protection can be called Motor Cycle protection or Bouncing Current protection.

1360 is the protect time in minutes which is adjustable via input arrows 1320. The protect time is the period given to the close motor to recoup after any of the various triggers for protection of the close motor. In this case the protect time option is grayed out as the Never Close option 1368 has been selected.

1368 is the never reclose option. Selecting this option means that if the system intervenes to protect the close motor, then the system does not resume operation after a protect time period but waits until the equipment is fixed and the users clear the pump protect status using button 1376. Selecting the never reclose option 1368 will override any selections for a protect time option.

1384 is a text box that indicates that the current pump protect was caused by a "Cycle Limit" failure. It may be more natural to call this "Close Motor Protect Type" but as the industry has already had anti-pump protection, it is useful to lump these other forms of close motor protections as alternatives to pump protect.

As 1332 provides the current status of the network protector relay as in Pump Protect (in other words intervening to protect the close motor), 1384 notes what triggered the pump protect. In this instance, the pump protect was triggered by a Cycle Limit of 3 cycles within 35 seconds. As FIG. 8 shows that the network protector relay logic is operating under Never Reclose option 1368, the status of the failure is available when the network protector relay is connected to a laptop computer or analogous device. If the Never Reclose 1368 was not selected, then the most recent action to intervene and protect the close motor may have been reset after the prescribed protect time 1360 and the trigger for the pump protect action may not be available as the network protector relay logic is not currently in pump protect. Alternatively, the most recent cause for a pump protect intervention may be stored and accessed (not shown here).

1380 is the send button. Selecting this button causes the current configuration for close motor protection to be sent to the relevant equipment.

FIG. 9—User Interface and Timed Protection.

FIG. 9 is much like FIG. 8. FIG. 9 differs from FIG. 8 in that the Never Reclose option 1368 is not selected. Thus, any intervention to protect the close motor continues for 20 minutes as that is the value selected for Protect Time 1360. FIG. 9 shows a situation with no current intervention to protect the close motor. Text box 1384 reflects this situation with a report of No Pumping Problems. Other text could be used such as No Current Interventions or simply no text at all.

ALTERNATIVES AND VARIATIONS

Detecting Failure to Close Through Measured Voltages.

An example set forth above in connection with FIG. 4 suggests measuring detecting a failure of the network protector breaker 208 to close via an extended period of activation current being applied to the close motor 220. An alternative method to detect a failure to close is to note a failure of the voltages across the network protector breaker 208 to change after the close motor 220 attempts to close the network protector breaker 208. This latter method may not work well in network protectors with a manual protector arm that inhibits the operation to close in the network protector as the use of the manual protector arm may trigger the close motor protection which might need to be cleared after the manual protector arm had been returned to the operating position.

Another variation is to monitor the actions of the network protector relay logic 204 to determine if there has been repeated or prolonged efforts to use the close motor 220 to close the network protector breaker 208. This method does not work well when a manual protector arm prevents the close contact 240 from operating to provide power to the close motor, as the logic may intervene to protect a close motor that is not at risk.

Figure 10:
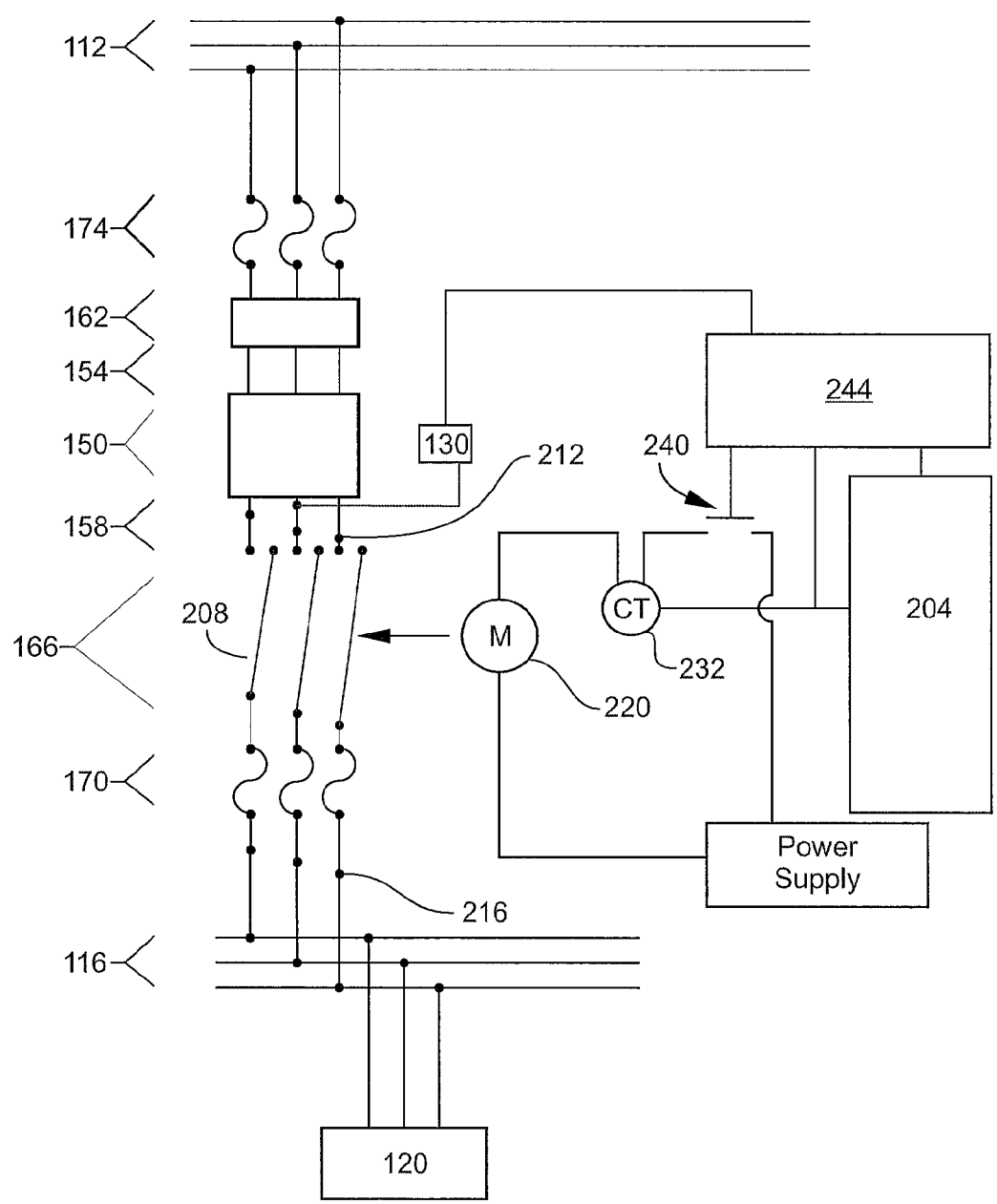
FIG. 10 differs from FIG. 3 in that the logic to protect the close motor is separate from the network protector breaker logic as may be in the case of a retrofit of legacy equipment.

FIG. 10—Logic Implemented Outside of Network Protector Relay.

While the examples set forth above placed the monitoring of the close motor 220 within the network protector relay logic 204, this activity could be handled external to the network protector relay logic 204 to allow an upgrade to legacy equipment. FIG. 9 shows one representation of this concept.

FIG. 10 shows a network protector breaker 208 which is used to isolate a transformer 150 from a local distribution network so that a transformer that is not being supplied with power to its primary side does not incur back feed where power flows through the secondary to the primary side.

Rather than the network protector relay logic 204 directly operating the close contact 240 to allow current to flow to the close motor 220 as shown in FIG. 3, the network protector relay logic 204 output is provided to close motor protect logic 244. Close motor protect logic 244 considers the information obtained from current transformer 232 and any additional information to determine whether the close motor 220 needs to be protected from the request from the legacy network protector relay logic 204.

As the close motor protect logic 244 interrupts the flow of power requested by the legacy network protector relay logic 204, the close motor protect logic 244 may operate without any modification to the network protector relay logic 204.

The power line carrier transmitter 130 may convey to a remote location the measured voltages on either side of the network protector breaker 208 and status flags from network protector relay logic 204 and status flags from the close motor protect logic 244. Thus, a report of an intervention to protect a network protector close motor may be conveyed to operators monitoring operation of a power distribution network.

One of ordinary skill in the art could extend the use of two microprocessors to three or more microprocessors and bias the group of microprocessors to favor opening the network protector if a minority of microprocessors decides to open but require a majority or a super majority before closing the network protector breaker.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

The invention claimed is:

1. A process to protect a network protector close motor, the process comprising:
   monitoring current provided to network protector close motor;
   recognizing that the network protector close motor is at risk of damage from overheating;
   initiating an intervention to stop current from being provided to the network protector close motor; and
   ceasing the intervention; and
   wherein the step of recognition that the network protector close motor is at risk of damage from overheating is detecting a period of continuous current flow in excess of a fixed time duration T.

2. The process of claim 1 wherein the step of ceasing the intervention occurs after a timed delay.

3. The process of claim 1 wherein the step of ceasing the intervention happens after receipt of an instruction from a technician to clear the intervention.

4. The process of claim 1 wherein a user may select from a set of options that includes:
   A) ceasing the intervention occurs after a timed delay; and
   B) ceasing the intervention only after receipt of an instruction from a technician to clear the intervention.

5. A process to protect a network protector close motor, the process comprising:
   monitoring current provided to network protector close motor;

recognizing that the network protector close motor is at risk of damage from overheating;

initiating an intervention to stop current from being provided to the network protector close motor; and ceasing the intervention; and wherein the step of recognition that the network protector close motor is at risk of damage from overheating is detecting a series of N bursts of current applied to the close motor during a time period T.

6. The process of claim 5 wherein the step of ceasing the intervention occurs after a timed delay.

7. The process of claim 5 wherein the step of ceasing the intervention happens after receipt of an instruction from a technician to clear the intervention.

8. A process to protect a network protector close motor, the process comprising:

monitoring current provided to network protector close motor;

recognizing that the network protector close motor is at risk of damage from overheating;

initiating an intervention to stop current from being provided to the network protector close motor; and ceasing the intervention; and wherein the intervention prohibits a close contact from providing current to the network protector close motor.

9. A process to protect a network protector close motor, the process comprising:

monitoring current provided to network protector close motor;

recognizing that the network protector close motor is at risk of damage from overheating;

initiating an intervention to stop current from being provided to the network protector close motor; and ceasing the intervention; and wherein a report of the intervention is conveyed by a transmitter to operators monitoring operation of a power distribution network.

10. A system to close a network protector breaker in which:

a control system associated with the network protector breaker discerns that it is appropriate to close the network protector breaker based upon an evaluation of measured values including voltages on either side of the network protector breaker;

the control system acts to provide electrical energy to a closing motor to cause the network protector breaker to close; and the closing motor acts to close the network protector breaker;

wherein the improvement comprises:

monitoring to discern that the closing motor is being provided with electrical energy to cause the network protector breaker to close;

sensing a failure of the network protector breaker to close in response to prolonged efforts by the closing motor; then preventing provision of electrical energy to the closing motor in order to protect the closing motor; and wherein the monitoring to discern that the closing motor is being provided with electrical energy comprises:

connecting a current transformer to one side of the closing motor to output an indication of current flow; and monitoring the indication of current flow.

11. The system of claim 10 wherein the preventing provision of electrical energy continues for a duration of a timer and then the preventing ends.

12. The system of claim 10 wherein the preventing provision of electrical energy continues until a technician requests that the preventing cease.

13. A system to close a network protector breaker in which:

a control system associated with the network protector breaker discerns that it is appropriate to close the network protector breaker based upon an evaluation of measured values including voltages on either side of the network protector breaker;

the control system acts to provide electrical energy to a closing motor to cause the network protector breaker to close; and the closing motor acts to close the network protector breaker;

wherein the improvement comprises:

monitoring to discern that the closing motor is being provided with electrical energy to cause the network protector breaker to close;

sensing a failure of the network protector breaker to close in response to prolonged efforts by the closing motor; then preventing provision of electrical energy to the closing motor in order to protect the closing motor; and wherein sensing the failure of the network protector breaker to close in response to prolonged efforts of the closing motor comprises:

discerning that the closing motor has been provided with electrical energy for a period of time in excess of a time period in excess of a time necessary to close the network protector breaker.

14. A system to close a network protector breaker in which:

a control system associated with the network protector breaker discerns that it is appropriate to close the network protector breaker based upon an evaluation of measured values including voltages on either side of the network protector breaker;

the control system acts to provide electrical energy to a closing motor to cause the network protector breaker to close; and the closing motor acts to close the network protector breaker;

wherein the improvement comprises:

monitoring to discern that the closing motor is being provided with electrical energy to cause the network protector breaker to close;

sensing a failure of the network protector breaker to close in response to prolonged efforts by the closing motor; then preventing provision of electrical energy to the closing motor in order to protect the closing motor; and wherein sensing the failure of the network protector breaker to close in response to prolonged efforts of the closing motor comprises:

discerning that the closing motor has been provided with electrical energy a number of times within a specified time period.

15. A system to close a network protector breaker in which:

a control system associated with the network protector breaker discerns that it is appropriate to close the network protector breaker based upon an evaluation of measured values including voltages on either side of the network protector breaker;

the control system acts to provide electrical energy to a closing motor to cause the network protector breaker to close; and the closing motor acts to close the network protector breaker;

wherein the improvement comprises:
monitoring to discern that the closing motor is being provided with electrical energy to cause the network protector breaker to close;
sensing a failure of the network protector breaker to close in response to prolonged efforts by the closing motor; then
preventing provision of electrical energy to the closing motor in order to protect the closing motor; and
wherein sensing the failure of the network protector breaker to close in response to prolonged efforts by the closing motor causes a message to be sent to a remote location identifying the close motor that is failing to close the network protector breaker.

16. A system to close a network protector breaker in which:
a control system associated with the network protector breaker discerns that it is appropriate to close the network protector breaker based upon an evaluation of measured values including voltages on either side of the network protector breaker;
the control system acts to provide electrical energy to a closing motor to cause the network protector breaker to close; and
the closing motor acts to close the network protector breaker;
wherein the improvement comprises:
monitoring to discern that the closing motor is being provided with electrical energy to cause the network protector breaker to close;
sensing a failure of the network protector breaker to close in response to prolonged efforts by the closing motor; then
preventing provision of electrical energy to the closing motor in order to protect the closing motor; and
wherein sensing the failure of the network protector breaker to close in response to prolonged efforts by the closing motor is achieved by detecting a number of repeated open close cycles equal to R within time period P.

17. A system to close a network protector breaker in which:
a control system associated with the network protector breaker discerns that it is appropriate to close the network protector breaker based upon an evaluation of measured values including voltages on either side of the network protector breaker;
the control system acts to provide electrical energy to a closing motor to cause the network protector breaker to close; and
the closing motor acts to close the network protector breaker;
wherein the improvement comprises:
monitoring to discern that the closing motor is being provided with electrical energy to cause the network protector breaker to close;
sensing a failure of the network protector breaker to close in response to prolonged efforts by the closing motor; then
preventing provision of electrical energy to the closing motor in order to protect the closing motor; and
wherein sensing the failure of the network protector breaker to close in response to prolonged efforts by the closing motor is achieved by a comparison of a current temperature of the closing motor during a close request with a temperature of the closing motor before the close request.

18. A system to close a network protector breaker in which:
a control system associated with the network protector breaker discerns that it is appropriate to close the network protector breaker based upon an evaluation of measured values including voltages on either side of the network protector breaker;
the control system acts to provide electrical energy to a closing motor to cause the network protector breaker to close; and
the closing motor acts to close the network protector breaker;
wherein the improvement comprises:
monitoring to discern that the closing motor is being provided with electrical energy to cause the network protector breaker to close;
sensing a failure of the network protector breaker to close in response to prolonged efforts by the closing motor; then
preventing provision of electrical energy to the closing motor in order to protect the closing motor; and
wherein sensing the failure of the network protector breaker to close in response to prolonged efforts by the closing motor is achieved by a comparison of a current temperature of the closing motor during a close request with a temperature of an ambient temperature near the closing motor.

19. A system to close a network protector breaker in which:
a control system associated with the network protector breaker discerns that it is appropriate to close the network protector breaker based upon an evaluation of measured values including voltages on either side of the network protector breaker;
the control system acts to provide electrical energy to a closing motor to cause the network protector breaker to close; and
the closing motor acts to close the network protector breaker;
wherein the improvement comprises:
monitoring to discern that the closing motor is being provided with electrical energy to cause the network protector breaker to close;
sensing a failure of the network protector breaker to close in response to prolonged efforts by the closing motor; then
preventing provision of electrical energy to the closing motor in order to protect the closing motor; and
wherein sensing the failure of the network protector breaker to close in response to prolonged efforts by the closing motor is achieved by a detection of a rate of change of a temperature of the closing motor in excess of R for a time period of T.

20. A process to protect a network protector close motor, the process comprising:
monitoring current provided to network protector close motor;
recognizing that the network protector close motor is at risk of damage from overheating;
initiating an intervention to stop current from being provided to the network protector close motor; and
ceasing the intervention; and
wherein the step of recognition that the network protector close motor is at risk of damage from overheating is detecting a number of repeated open close cycles equal to R within time period P.

21. A process to protect a network protector close motor, the process comprising:
- monitoring current provided to network protector close motor;
- recognizing that the network protector close motor is at risk of damage from overheating;
- initiating an intervention to stop current from being provided to the network protector close motor; and
- ceasing the intervention; and
- wherein the step of recognition that the network protector close motor is at risk of damage from overheating is based upon a comparison of a current temperature of the network protector close motor during a close request with a temperature of the network protector close motor before the close request.

22. A process to protect a network protector close motor, the process comprising:
- monitoring current provided to network protector close motor;
- recognizing that the network protector close motor is at risk of damage from overheating;
- initiating an intervention to stop current from being provided to the network protector close motor; and
- ceasing the intervention; and
- wherein the step of recognition that the network protector close motor is at risk of damage from overheating is based upon a comparison of a current temperature of the network protector close motor during a close request with a temperature of an ambient temperature near the network protector close motor.

23. A process to protect a network protector close motor, the process comprising:
- monitoring current provided to network protector close motor;
- recognizing that the network protector close motor is at risk of damage from overheating;
- initiating an intervention to stop current from being provided to the network protector close motor; and
- ceasing the intervention; and
- wherein the step of recognition that the network protector close motor is at risk of damage from overheating is based upon a rate of change of a temperature of the network protector close motor in excess of R for a time period of T.

* * * * *